Oct. 11, 1960
C. E. SHADER ET AL
2,955,494
WIRE STRIPPER
Filed Feb. 6, 1959
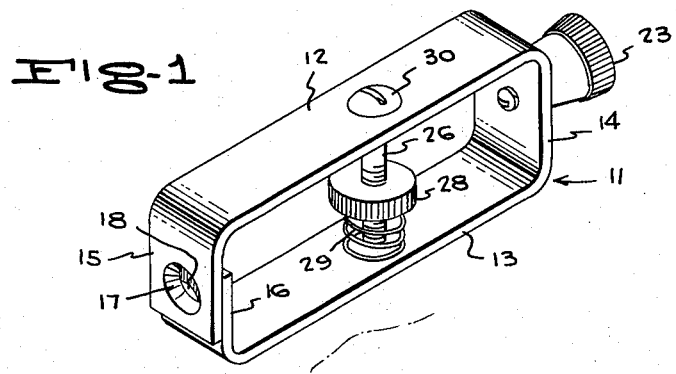
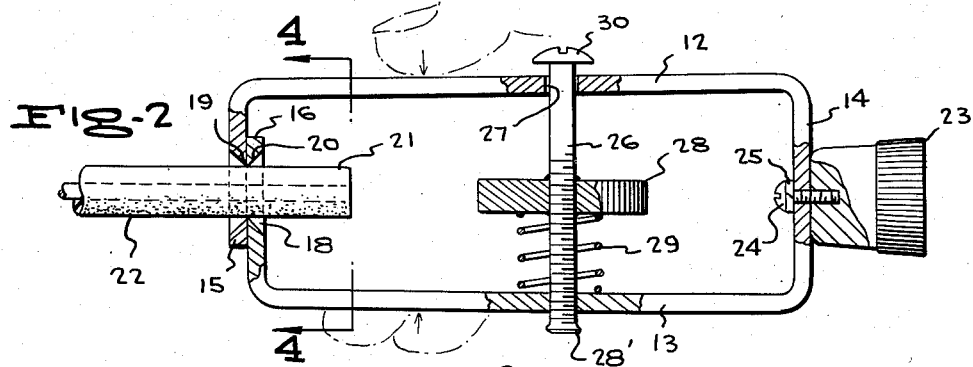
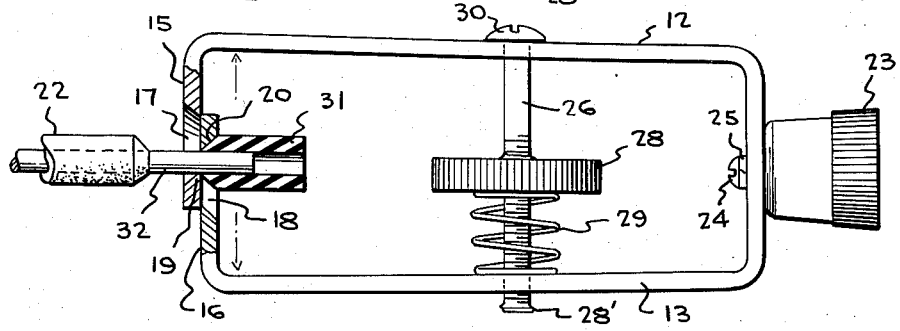
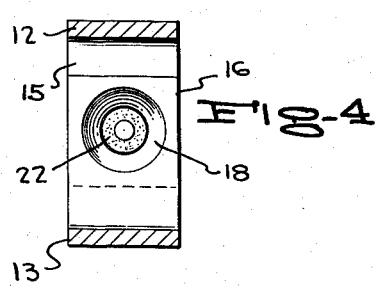
INVENTORS
CHARLES E. SHADER &
ROY C. SWEET
BY
McMorrow, Berman + Davidson
ATTORNEYS United States Patent Office 2,955,494
Patented Oct. 11, 1960

2,955,494
WIRE STRIPPER
Charles E. Shader and Roy C. Sweet, both of 165 Oneida St., Oneonta, N.Y.
Filed Feb. 6, 1959, Ser. No. 791,749
4 Claims. (Cl. 81—9.5)

This invention relates to wire stripping tools, and more particularly to a wire stripping implement adapted to be employed to strip the insulation from a wire end located in a relatively inaccessible or difficult location.

A main object of the invention is to provide a novel and improved wire stripping implement which is simple in construction, which is easy to use, and which is accurately adjustable in accordance with the size of the wire end with which it is to be employed so that it will not mar or damage the conductor of the wire.

A further object of the invention is to provide an improved wire stripping tool which is inexpensive to manufacture, which is durable in construction, which is compact in size and which is especially adapted for use in constricted spaces or in locations which are relatively difficult to reach.

Further objects and advantages of the invention will become apparent from the following description and claims, and from the accompanying drawings, wherein:

Figure 1 is a perspective view of an improved wire stripper constructed in accordance with the present invention.

Figure 2 is a side elevational view, partly in vertical cross section, of the wire stripper of Figure 1, shown engaged with a wire end preliminary to stripping the insulation therefrom.

Figure 3 is a side elevational view, partly in vertical cross section, and illustrating the positions of the cooperating cutting elements of the tool after the cutting edges thereof have penetrated through the insulation on the wire end.

Figure 4 is a vertical cross sectional view taken on the line 4—4 of Figure 2.

Referring to the drawings, 11 generally designates an improved wire stripper constructed in accordance with the present invention. The wire stripper 11 comprises an elongated bar-like body of spring metal which is bent to define a pair of opposing arms 12 and 13 integrally connected by a transversely extending bight portion 14 which is substantially perpendicular to the arms 12 and 13. The respective arms 12 and 13 are formed with inwardly directed overlapping end portions 15 and 16 which are substantially perpendicular to the arms. The overlapping end portions 15 and 16 are respectively formed with registrable openings 17 and 18, said openings being located so that they may be brought into registry responsive to inward squeezing force exerted on the arms 12 and 13. As is clearly shown in Figures 2 and 3, the openings 17 and 18 are beveled so that they converge towards each other whereby to define closely adjacent circular cutting edges 19 and 20 adapted to shearingly cooperate to exert a cutting action on the insulating covering 21 of a wire end 22 inserted through the openings.

Secured to the intermediate portion of the transversely extending bight member 14 substantially in axial alignment with the openings 17 and 18 is a knob member 23, said knob member being fastened to the bight portion 14 in any suitable manner, for example, by a fastening screw 24 extending through an aperture provided in the bight portion 14 and threadedly engaged in the knob member 23, the screw being provided with a lock washer 25 to lock the screw and thus rigidly fasten the knob member 23 to bight portion 14.

Designated at 26 is a headed stop screw which is engaged through an aperture 27 formed in the intermediate portion of arm 12 and which is threadedly engaged through the intermediate portion of the opposing arm 13, the threaded end of the screw 26 being upset at 28' to prevent loss of the screw. Rigidly secured on the intermediate portion of the stop screw 26 is a knurled disc member 28 of substantial diameter which is employed to manually rotate the screw 26 whereby to establish a desired setting thereof, in accordance with the size of an insulated wire end to be stripped. A coiled spring 29 surrounds the threaded portion of the screw 26, bearing between the arm 13 and the operating disc 28 and exerting a holding force on the adjusting screw to maintain it in a given position of adjustment until the disc member 28 is manually rotated to change the adjustment.

Since the body of the device is made of spring metal, the arms 12 and 13 normally tend to assume positions limited by the engagement of the arm 12 with the head 30 of the adjusting screw 26, for example, as shown in Figure 3. The resiliency of the body of the device thus acts to urge the circular cutting edges 19 and 20 outwardly relative to each other and away from the axially aligned positions of the openings illustrated in Figure 2.

In using the device, the arms 12 and 13 are manually squeezed together sufficiently to bring the openings 17 and 18 sufficiently into registry to receive the wire end 22 to be stripped, whereby said wire end is engaged through the openings in the manner illustrated in Figure 2. As will be readily apparent, the adjusting member 28 may be operated by the fingers of the hand to adjust the limiting positions of the arcuate shearing edge portions without removing the hand from its grasping relationship with respect to the device. The knob 23 is then grasped and rotated, to thus rotate the device around the axis defined by the wire end 22, whereby the cooperating opposing arcuate shearing edge portions of the openings 17 and 18 cut into the insulating covering 21 of the wire end until finally the insulating covering is substantially cut through, as shown in Figure 3, further expansion of the spring arms 12 and 13 being prevented by the engagement of arm 12 with the head 30 of stop screw 26. It will be understood that the cutting action occurs as the device is rotated by means of knob 23, whereby it is merely necessary for the user to grasp the knob 23 and rotate same after first adjusting the member 28, as above described. After the cutting action has been completed, namely, when the spring arms 12 and 13 have reached the positions illustrated in Figure 3, the severed portion 31 of the insulation may be removed from the wire end by merely pulling the implement outwardly, namely, to the right, as viewed in Figure 3, whereby the portion 31 is removed, leaving the bared wire end portion 32.

As will be readily understood, the device may be easily inserted in relatively narrow spaces, being therefore adapted for use in reaching relatively short wire end portions to be stripped and which would otherwise be inaccessible to wire stripping implements heretofore employed.

While a specific embodiment of an improved wire stripper has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wire stripper comprising a body of spring metal having a pair of opposing arms connected at one end, respective inwardly directed overlapping portions carried by the other ends of said arms, said portions being formed with registrable openings having cutting edges, said openings being adapted to receive a wire end and said arms acting to urge said edges outwardly in opposite directions, whereby to exert cutting force on said wire end, adjustable headed stop means connected to the intermediate portion of one of said arms and extending perpendicularly through and being engageable by the intermediate portion of the other arm to limit relative outward movement of said arms, and an adjusting member mounted on the intermediate portion of said stop means and being located between said arms, whereby said stop means may be adjusted while said arms are being grasped by the user's hand.

2. A wire stripper comprising a body of spring metal having a pair of opposing arms connected at one end, respective inwardly directed overlapping portions carried by the other ends of said arms, said portions being formed with registrable openings, said openings being oppositely beveled to define adjacent cutting edges, said openings being adapted to receive a wire end and said arms acting to urge said edges outwardly in opposite directions, whereby to exert cutting force on said wire end, adjustable headed stop means connected to the intermediate portion of one of said arms and extending perpendicularly through and being engageable by the intermediate portion of the other arm to limit relative outward movement of said arms, a knob member secured to said body at said one end substantially in axial alignment with said openings, and an adjusting member mounted on the intermediate portion of said stop means and located between said arms, whereby said stop means may be adjusted while said arms are being grasped by the user's hand.

3. A wire stripper comprising a body of spring metal having a pair of opposing arms connected at one end, respective inwardly directed overlapping portions carried by the other ends of said arms, said portions being formed with registrable openings, said openings being oppositely beveled to define adjacent substantially circular cutting edges, said openings being adapted to receive a wire end and said arms acting to urge said edges outwardly in opposite directions, whereby to exert cutting force on said wire end, a headed stop screw extending perpendicularly through the intermediate portion of one of the arms and threadedly engaged in the intermediate portion of the other arm and being engageable with said one of the arms to limit relative outward movement of the arms, an adjusting member rigidly mounted on the intermediate portion of said stop screw and located between the arms, whereby said screw may be adjusted while said arms are being grasped by the user's hand.

4. A wire stripper comprising a body of spring metal having a pair of opposing arms connected by a transversely extending bight portion, respective inwardly directed overlapping portions on the ends of said arms, said last-named portions being formed with registrable openings, said openings being oppositely beveled to define substantially circular, closely adjacent cutting edges, said openings being adapted to receive a wire end and said arms acting to urge said edges outwardly in opposite directions, whereby to exert cutting force on said wire end, a headed stop screw threadedly connected to the intermediate portion of one of said arms and extending perpendicularly through and being engageable by the other arm to limit relative outward movement of said arms, an adjusting member rigidly mounted on the intermediate portion of said stop screw and being located between the arms, whereby said screw may be adjusted while said arms are being grasped by the user's hand, and a knob member secured to said bight portion and extending outwardly therefrom substantially in axial alignment with said openings.

References Cited in the file of this patent

UNITED STATES PATENTS

| | | |
|---|---|---|
| 389,925 | Griscom | Sept. 25, 1888 |
| 860,711 | Vosper | July 23, 1907 |
| 967,998 | Swan | Aug. 23, 1910 |
| 1,685,977 | Bollerman | Oct. 2, 1928 |
| 2,667,094 | Potter | Jan. 26, 1954 |
| 2,795,982 | Mathias | June 18, 1957 |
| 2,894,424 | Vaughan | July 4, 1959 |

FOREIGN PATENTS

| | | |
|---|---|---|
| 333,822 | France | Oct. 2, 1903 |
| 269,554 | Switzerland | Oct. 16, 1950 |
| 574,602 | Great Britain | Jan. 11, 1956 |